Aug. 28, 1951 J. G. CAPSTAFF 2,566,165
FILM PERFORATION PITCH GAUGE
Filed Dec. 9, 1949 2 Sheets-Sheet 1
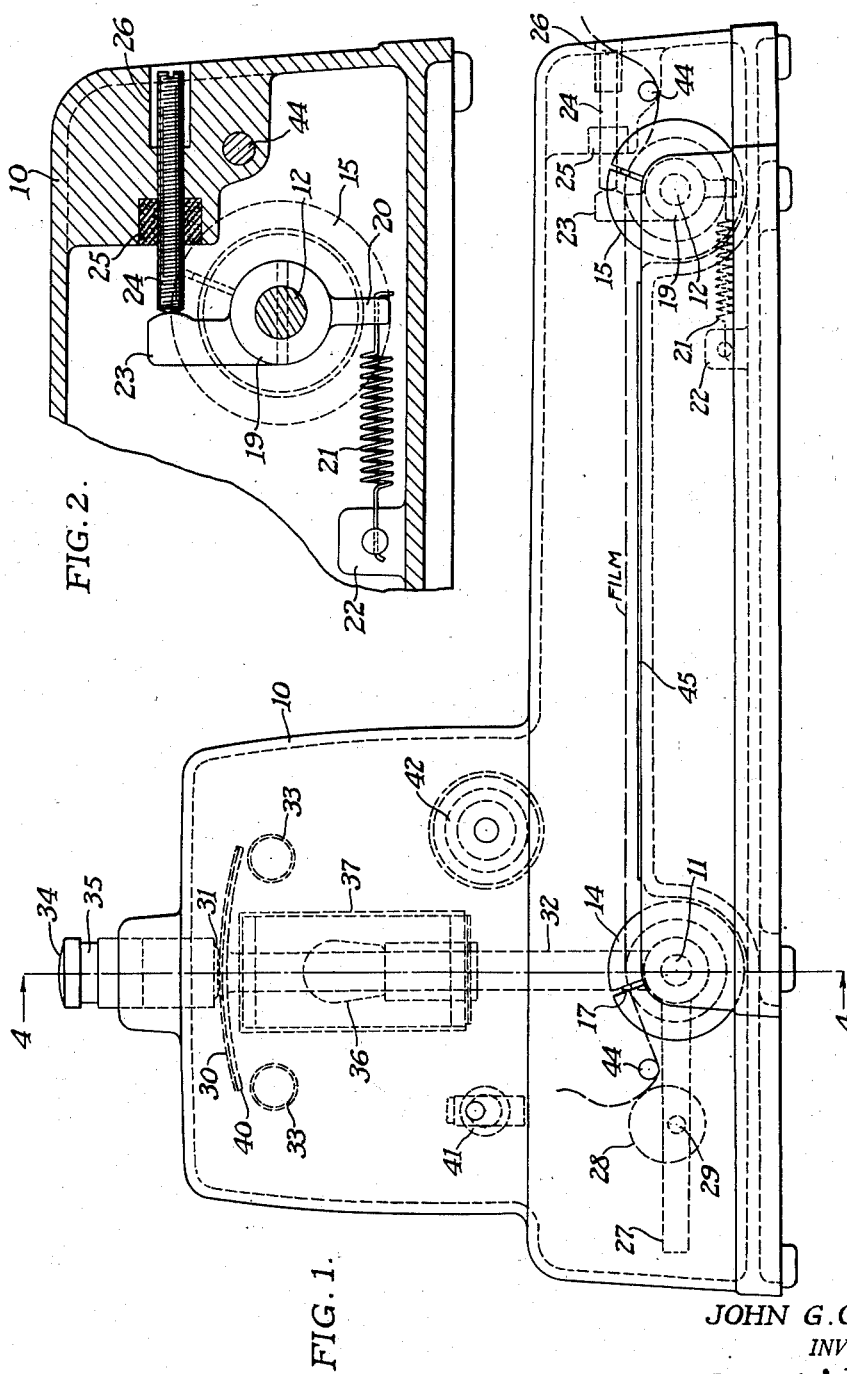
JOHN G. CAPSTAFF
INVENTOR.
BY Daniel J. Mayne
Frank R. Gollon
ATTORNEYS Aug. 28, 1951     J. G. CAPSTAFF     2,566,165
FILM PERFORATION PITCH GAUGE Filed Dec. 9, 1949     2 Sheets-Sheet 2

JOHN G. CAPSTAFF
INVENTOR.

BY Daniel J. Mayne
Frank R. Gollon
ATTORNEYS

Patented Aug. 28, 1951

2,566,165

UNITED STATES PATENT OFFICE 2,566,165

FILM PERFORATION PITCH GAUGE

John G. Capstaff, Rochester, N. Y., assignor to Eastman Kodak Company, Rochester, N. Y., a corporation of New Jersey Application December 9, 1949, Serial No. 131,957

4 Claims. (Cl. 33—147)

This invention relates to a gauge and more particularly to a gauge for determining the perforation pitch of motion picture films.

Although modern perforation machines are capable of a considerable degree of accuracy and uniformity, it is well known that film dimensions and, therefore, perforation pitch are subject to very definite changes with variations in atmospheric humidity. Excessively dry conditions and aging will result in film shrinkage of an appreciable amount. These changes in film dimensions and the accompanying changes in perforation pitch are of especially serious consequence in those film processing and printing operations in which it is required to register a number of motion picture films as in the multilayer process, involving the transfer of emulsion layers from one film base to another, or in imbibition printing.

In the multilayer process where the several emulsion layers are successively transferred from the multilayer film to separate film bases, it is necessary that each film base is made to register precisely with the multilayer film during the transfer period in order that the corresponding frames of each of the separation negatives (or positives) so produced may bear the same positional relationship to the perforations. It is for this reason that in the design and construction of stripping apparatus for the transfer of emulsion layers from a multilayer film to separate film bases means are usually provided for stretching or at least compensating for the shorter of the two films in order that the two may be held in registry during the critical period when an emulsion layer is being transferred to a film base.

In imbibition printing, each of a number of color separation matrices is successively registered with a blank film. Here, too, registration must be maintained during the dye-transfer period. This is accomplished by registering the film perforations by means of sprockets, pin belts or equivalent devices. Where the perforation pitch of the several films varies even to a minute degree, trouble may well result in the form of poor definition and color fringes. Imbibition printers, like multilayer stripping machines, thus often include means for compensating for or stretching the shorter of the two films. Still other machines register the superposed films throughout the length of their contact by the use of pin belts or large toothed-drums which register the superposed films at substantially every frame.

Any device which operates upon the principle of registering several films by means of stretching the shorter to the dimension of the longer or compensating in any other manner for such differences is usually limited in the extent to which it will satisfactorily operate. Thus, where one of the films is badly shrunken, it may not be possible to stretch it sufficiently to have it register with the unshrunken or longer film. In such cases, it is highly desirable that the perforation pitch of the several films be ascertained prior to their being run through the machine to determine whether the difference in perforation pitch can be handled by the particular machine. A device for measuring film perforation pitch would also be valuable for selecting films having perforation pitches within certain limits as may be required by individual machines.

In the photographic printing by conventional means of copies from old films, it is very desirable that the pitch of at least the old film be first determined since this film may have lost a considerable amount of its moisture content or plasticizer resulting in an unusually large per cent shrinkage which would make the printing of such a film difficult, if not impossible, by conventional methods.

It is, therefore, apparent that there exists a need for an inexpensive, yet highly accurate, device for measuring film perforation pitch. The herein-disclosed device, moreover, may be conveniently used for taking readings within a roll and is readily adapted for dark room use as will be apparent from the following description. Such devices which are now known have been unduly expensive or not capable of the accuracy necessary for this type of measurement. Many were little more than specially constructed rules upon which the film was stretched and readings taken from the markings thereon. These, of course, were susceptible to the personal error of the operator and could not be readily calibrated and adjusted. In addition these were not adapted for dark room use and could not be used with sensitized films.

It is, therefore, an object of this invention to provide an improved device for determining film perforation pitch.

It is a further object of this invention to provide a device of this character which is capable of considerable accuracy.

It is a still further object of this invention to provide a device which is readily convenient for taking readings anywhere within a roll of film and which is capable of dark room use.

It is a still further object of this invention to provide a film perforation pitch gauge which may be readily calibrated and adjusted.

It is a still further object of this invention to provide a device of the character described which is easily manipulated, largely free of the personal error, and relatively simple in construction and inexpensive.

Other objects and advantages of the invention will become apparent from the following description taken in connection with the accompanying drawings, and it will be understood that many changes may be made in the details of construction and arrangement of parts shown and described without departing from the spirit of the invention as expressed in the accompanying claims. I, therefore, do not wish to be limited to the exact details shown and described as the preferred form only has been shown by way of illustration.

In the drawings:

Fig. 1 is a front elevation of a film perforation pitch gauge embodying the present invention;

Fig. 2 is an enlarged sectional view of the normally fixed spool showing the details of the means for calibrating and adjusting the angular position of the spool;

Figure 3:
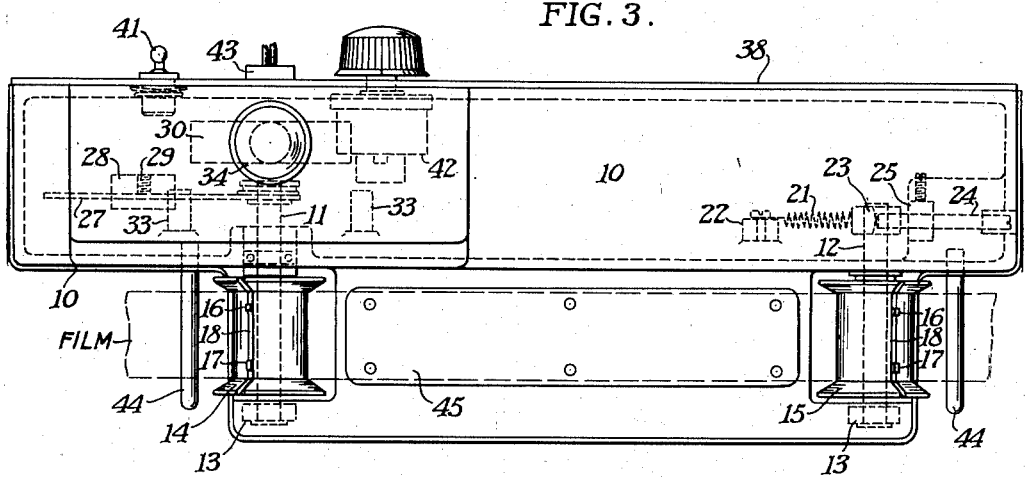
Fig. 3 is a top view of the film perforation pitch gauge.
Figure 5:
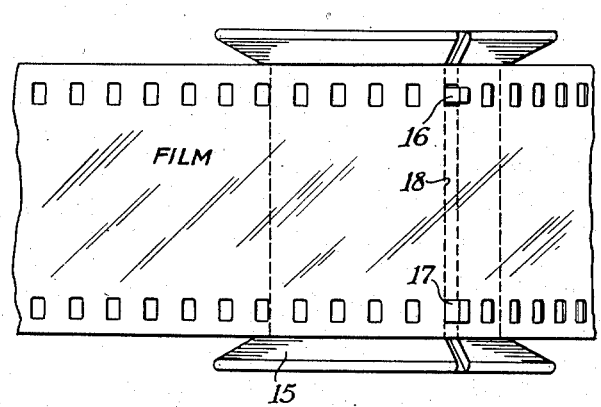
Fig. 5 is an enlarged top view of the normally fixed spool showing a strip of film held thereon.
Figure 4:
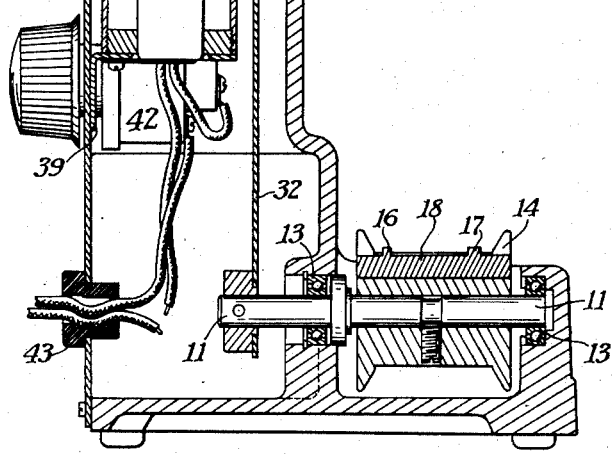
Fig. 4 is a sectional view taken on the line 4—4 of Fig. 1.

The preferred form of the film perforation pitch gauge embodying the present invention is illustrated in Figs. 1 and 3 and comprises the casing 10 in which are journalled the spindles 11 and 12. These spindles, set in bearings 13, have mounted thereon the spools 14 and 15, each of which is of identical construction having flanges and a single pair of teeth 16 and 17. The leading edges of each pair of teeth are carefully aligned to preclude any error in the reading resulting from misalignment of the teeth. The teeth are so dimensioned as to accommodate either the round side (Bell & Howell) or straight side (Eastman) type of perforation, the teeth 16 being somewhat narrower than the teeth 17, as illustrated in Fig. 5, and being so positioned relative to the teeth 17 to accommodate films showing small variations in the lateral spacing of the perforations. It is also desirable, although not absolutely necessary, that the thickness of the teeth be slightly less than the height of the film perforations in order that they may readily fit all film perforations despite small variations in the height thereof. For manufacturing considerations and for purposes of replacement, each pair of teeth may be formed integral with a strip 18 which is insertable in a slot in the flanged spool, as shown in Fig. 4.

The spool 15 is normally fixed although capable of adjustment for reasons which will become apparent. The adjustment mechanism, illustrated in Fig. 2, comprises an element 19 which is pinned upon the spindle 12 within the casing 10. This element has two offset lugs, one of which 20 is fastened to the end of a tension spring 21 which is anchored to the boss 22. The other lug 23 is caused by the action of the spring to bear upon the end of a micrometer or adjusting screw 24 which is threaded into a tapped bushing 25 set in the body of the casing 10. The other end of the screw 24 lies in a recess 26 in the body of the casing and is provided with a slotted end to receive a screw driver for purposes of adjustment, whereby the lugged element 19 may be rotated against the action of the spring or by the spring to correspondingly rotate the spindle 12 and the spool 15 fixed thereto.

The spool 14 is biased to rotate in a direction which would tend to draw taut a length of film engaged by the teeth of the two spools. The biasing mechanism, best shown in Figs. 1 and 3, comprises an arm 27 which is secured at one end to the spindle 11. A weighted element 28 is slidably mounted upon the arm 27 and may be fastened at any position thereon by means of setscrew 29, whereby the force tending to rotate the spool 14 may be varied within limits for adjustment purposes. The largest torque which can be applied by this biasing mechanism to the spindle and spool 14 is, however, never sufficient to overcome the tension of spring 21 and to cause counter-rotation (see Fig. 1) of the spool 15 against the action of that spring. The amount of tension applied to the film by the biasing action of the above mechanism will to some extent affect the readings obtainable with the gauge and it is, therefore, preferable that for the most accurate results the degree of tension thus applied be standardized.

It will be apparent that the amount of rotation of spool 14 will be an indication of the length of film engaged between the two spools and, therefore, if properly calibrated, may be made to measure the perforation pitch of the film. The rotation is measured by means of an arcuate scale 30 which is movable relative to a fixed reticle 31. The scale is fixed to the spindle 11 by means of an elongated arm 32, by reason of which the linear motion of the scale is proportionately considerably greater than the linear motion of the pair of teeth on spool 14. This arrangement makes possible the accurate measurement of small degrees of rotation of the spool 14. The scale is calibrated in accordance with the dimensions of the pitch gauge and may be made to read the actual pitch of the film perforations or plus or minus variations from standard pitch. It is obvious that for successful operation of the device some means must be provided whereby the operator is prevented from engaging a length of film between the two spools having more or less than a predetermined number of perforations between the tooth engaged portions of the film. This is accomplished by limiting the angle through which the spool 14 may rotate so that at one extreme of rotation the distance between the teeth on spools 14 and 15 is somewhat greater than the normal distance between the end perforations of a length of film spanning a predetermined number of perforations but less than the distance between the end perforations of a length of film spanning one more than this predetermined number of perforations. This permits the gauge to correctly indicate perforation pitch of a film which has stretched somewhat, or is oversize, and yet prevents the operator from placing a length of film upon the spools so that more than the predetermined number of perforations are spanned by the teeth on spools 14 and 15. At the other extreme of rotation of the spool 14, the distance between the teeth on spools 14 and 15 is somewhat less than the normal distance between the end perforations of a length of film spanning this predetermined number of perforations, but still greater than the distance between the end perforations of a length of film having one less than this predetermined number of perforations. This permits the gauge to correctly indicate the perforation pitch of a film which has shrunk somewhat and yet prevents the operator from placing a length of film upon the spools so that less than the predetermined number of perforations are spanned by the teeth on spools 14 and 15. It is readily apparent that, if the operator could place upon the spools a length of film spanning more or less than the predetermined number of perforations, the gauge would read incorrectly. The specific means which restricts the rotation of spool 14 between the required limits comprises a pair of stops 33, formed of some material such as rubber or felt, which are secured to the casing 10, which are adapted to engage the arm 32 fixed to the spindle 11 to which the spool 14 is secured.

Figure 6:
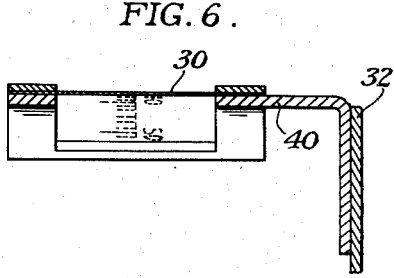
Fig. 6 is an enlarged sectional view of the scale and its mounting.

The reticle 31 is positioned just in front of the arcuate scale with the minimum clearance necessary for the scale to move relative to the reticle without danger of physical contact. An eyepiece lens 34 set in a draw-tube 35 permits the operator to readily read the deflection of the scale relative to the reticle. The illumination for the scale is the lamp 36 mounted in a housing 37 which is secured to the closure plate 38 for the casing by bracket 39, the lamp being mounted below the arcuate scale. A filter 46 may be provided in the top of the lamp housing in order that only that light to which the eye is most sensitive may be used, thereby keeping down the total level of illumination to reduce the risks of fogging the film when the gauge is used with sensitive film in a dark room. Or, if desired, a non-actinic filter may be employed. Instead of mounting the filter 46 in the lamp house, it could be positioned in the eyepiece tube. The scale itself is formed of a translucent material which preferably has low moisture absorption and consequent freedom from swelling, such as, for example, vinyl chloride resin or vinyl chloride-acetate resin. The details of the mounting of the scale 30 at the end of the arm 32 by means of the frame 40 are illustrated in Fig. 6. A toggle switch 41 and rheostat 42 for controlling the illumination of the lamp are of conventional design and are also secured upon the closure plate 38, the electrical connection being made by wires passing through a rubber grommet 43 set in an aperture in the closure plate. This arrangement of the electrical components upon the closure element 38 permits their removal from within the casing merely by removal of the cover plate.

In using the film perforation pitch gauge a length of film is grasped by the operator and engaged by the teeth on the spool 14. The film is then tensioned slightly in the direction of the spool 15 and secured on the teeth of spool 15 in such a manner that there is no sagging of film between the two spools. The film will be then under slight tension, this being the result of the biasing action of the weighted arm 27 upon the spool 14. The stops 33 restrict the movement of the arm 32 within predetermined limits whereby the rotation of spool 14 is restricted to a predetermined angle whereby it is insured that a definite number of film perforations are spanned by the teeth on the two rolls for reasons explained above. The operator then looks through the eyepiece, switches on the lamp and reads the scale which is calibrated, as above noted, to read directly in perforation pitch or to provide a reading showing the plus or minus deviation from standard pitch. Switching on the lamp while the eye is positioned over the eyepiece and then extinguishing the lamp before the eye is removed is an additional precaution to preclude fogging of the film by light escaping from the eyepiece. But for low levels of illumination or where a non-actinic filter is employed or where films not of the ultra-sensitive type are being gauged, this precaution will not be necessary. For the sake of convenience a stationary post 44 is provided beyond each spool, as clearly illustrated in Figs. 1 and 3, to hold badly curled film down onto the spool teeth. Another safety feature is the provision of a highly polished plate 45 secured to the casing by countersunk screws or rivets between the spools 14 and 15 to preclude scratching of the film or the emulsion as the film strip is drawn between and mounted upon the spool teeth.

An accurately perforated metal strip may also be provided for calibration purposes. This strip is placed upon the spool teeth and the micrometer or adjusting screw 24 turned until the scale reads standard pitch or zero deviation from standard pitch, depending upon how the said scale is calibrated.

It is to be understood that the film perforation pitch gauge embodying the present invention can be constructed for use with 35 mm., 16 mm. or any other size film. It is also apparent that such a device can be provided with but a single tooth on each spool to measure films having one or two rows of film perforations. With films having two rows of perforations, however, spools having two teeth per spool provide better support for the films to be gauged and are inclined to give more accurate readings.

From the foregoing description, it will be apparent that I have provided means for obtaining all the objects and advantages of this invention.

What I claim and desire to secure by Letters Patent of the United States is:

1. A gauge for determining film perforation pitch comprising a casing, a normally fixed element and a rotatable spool secured at spaced points to the outside of the casing, a film perforation engaging tooth on the fixed element and on the spool, a spindle on said spool extending into the casing, biasing means within the casing operating upon the spindle and tending to rotate the spool whereby a length of film engaged by said teeth is held taut between the fixed element and the spool, means to restrict the rotation of the spool to the predetermined angle of arc, an arm secured to the spindle within the casing, a reticle and a scale, one of which is fixed to the casing, the other secured to the arm, and means for viewing the scale and reticle from without the casing.

2. A gauge for determining film perforation pitch comprising a casing, a normally fixed spindle and a rotatable spindle mounted in a wall in said casing, a spool integrally mounted on each spindle outside the casing, a film perforation engaging tooth on each spool, biasing means within the casing operating upon the rotatable spindle and tending to rotate the spool secured thereto whereby a length of film engaged by said teeth is held taut between the two spools, means to restrict the rotation of the spool mounted on said rotatable spindle to a predetermined angle of arc, an arm integral with the rotatable spindle within the casing, a reticle and a scale, one of which is fixed to the casing, the other secured to the arm, means for viewing the scale and reticle from without the casing, and calibration means for effecting a rotational adjustment of the normally fixed spindle, including a projection on the fixed spindle, a micrometer screw adapted to engage the projection, and means to bias the projection against the screw.

3. A gauge for determining film perforation pitch comprising a casing, a normally fixed element having a single tooth adapted to engage one of a row of film perforations, a rotatable spool having a single tooth adapted to engage one of a row of film perforations, said normally fixed element and rotatable spool being secured at spaced points to the outside of the casing, a spindle on said spool extending into the casing, biasing means tending to rotate the spool whereby a length of film engaged by said teeth is held taut between the fixed element and the spool, means to restrict the rotation of the spool to a predetermined angle of arc, indicating means within the casing carried in part by the spindle and in part by the casing, and means for viewing the indicating means from without the casing.

4. A gauge for determining film perforation pitch comprising a casing, a normally fixed element and a rotatable spool secured at spaced points to the outside of the casing, the fixed element and spool each having a single pair of teeth adapted to engage in both rows of film perforations, a spindle on said spool extending into the casing, biasing means tending to rotate the spool whereby a length of film engaged by said teeth is held taut between the fixed element and the spool, means to restrict the rotation of the spool to a predetermined angle of arc, indicating means within the casing carried in part by the spindle and in part by the casing, and means for viewing the indicating means from without the casing.

JOHN G. CAPSTAFF.

REFERENCES CITED

The following references are of record in the file of this patent:

UNITED STATES PATENTS

| Number | Name | Date |
|---|---|---|
| 2,047,276 | Lyman et al. | July 14, 1936 |
| 2,244,964 | Poock et al. | June 10, 1941 |
| 2,445,340 | Thomas | July 20, 1948 |